(12) United States Patent
Akdim et al.

(10) Patent No.: US 12,369,107 B2
(45) Date of Patent: Jul. 22, 2025

(54) AUTONOMOUS CELL MEASUREMENTS

(71) Applicant: Apple Inc., Cupertino, CA (US)

(72) Inventors: Nabil Akdim, Munich (DE); Gencer Cili, San Jose, CA (US); Ajoy K Singh, Milpitas, CA (US); Muthukumaran Dhanapal, San Diego, CA (US)

(73) Assignee: Apple Inc., Cupertino, CA (US)

( * ) Notice: Subject to any disclaimer, the term of this patent is extended or adjusted under 35 U.S.C. 154(b) by 653 days.

(21) Appl. No.: 17/737,706

(22) Filed: May 5, 2022

(65) Prior Publication Data

US 2022/0386222 A1 Dec. 1, 2022

Related U.S. Application Data

(60) Provisional application No. 63/193,339, filed on May 26, 2021.

(51) Int. Cl.
*H04W 36/30* (2009.01)
*H04W 36/00* (2009.01)
*H04W 48/16* (2009.01)
*H04W 48/18* (2009.01)

(52) U.S. Cl.
CPC ....... *H04W 48/16* (2013.01); *H04W 36/0066* (2013.01); *H04W 48/18* (2013.01)

(58) Field of Classification Search
CPC .. H04W 36/0066; H04W 36/30; H04W 36/85
See application file for complete search history.

(56) References Cited

U.S. PATENT DOCUMENTS

| | | | |
|---|---|---|---|
| 2008/0198796 A1* | 8/2008 | Jen | H04W 8/26 370/328 |
| 2020/0128428 A1* | 4/2020 | Martinez Minguito | H04W 24/02 |
| 2021/0160720 A1* | 5/2021 | Chiang | H04B 17/318 |

(Continued)

FOREIGN PATENT DOCUMENTS

| | | |
|---|---|---|
| CN | 104170456 | 11/2014 |
| CN | 109417747 | 3/2019 |

(Continued)

OTHER PUBLICATIONS

Office Action for CN Patent Application No. 202210576735.3; Nov. 8, 2024.
Notice of Allowance for CN 202210576735.3; Mar. 28, 2025.

*Primary Examiner* — Barry W Taylor
(74) *Attorney, Agent, or Firm* — Kowert, Hood, Munyon, Rankin & Goetzel, P.C.

(57) ABSTRACT

This disclosure relates to techniques for a wireless device to autonomously perform certain cell measurements in a wireless communication system. A wireless device may establish a wireless link with a cellular base station. The wireless link may be established according to a first radio access technology. The wireless device may determine whether at least one cell that operates according to a second radio access technology is available at the current location of the wireless device based on information stored by the wireless device. If at least one cell that operates according to the second radio access technology is available, the wireless device may perform one or more cell measurements on a cell that operates according to the second radio access technology.

20 Claims, 7 Drawing Sheets

(56) References Cited

U.S. PATENT DOCUMENTS

| | | | |
|---|---|---|---|
| 2021/0267000 A1* | 8/2021 | Jain | H04W 8/245 |
| 2023/0036966 A1* | 2/2023 | Agarwal | H04W 36/26 |
| 2023/0180072 A1* | 6/2023 | Ranjan | H04W 48/18 |
| | | | 455/436 |
| 2024/0163968 A1* | 5/2024 | Karimidehkordi | H04W 24/10 |

FOREIGN PATENT DOCUMENTS

| | | |
|---|---|---|
| WO | 2018082078 | 11/2016 |
| WO | 2018117313 | 6/2018 |
| WO | 2021026892 | 2/2021 |

* cited by examiner

AUTONOMOUS CELL MEASUREMENTS

PRIORITY INFORMATION

This application claims priority to U.S. provisional patent application Ser. No. 63/193,339, entitled "Autonomous Cell Measurements," filed May 26, 2021, which is hereby incorporated by reference in its entirety as though fully and completely set forth herein.

FIELD

The present application relates to wireless communications, and more particularly to systems, apparatuses, and methods for a wireless device to autonomously perform certain cell measurements in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for a wireless device to autonomously perform certain cell measurements in a wireless communication system.

According to the techniques described herein, a wireless device with a wireless link established with one cell according to a first cellular communication technology may determine whether any cells that operate according to a second cellular communication technology are also available based on information stored by the wireless device, such as a database indicating cells that have been identified that operate according to the second cellular communication technology.

If any such cells are identified as potentially being available at the location of the wireless device, the wireless device may determine to autonomously perform cell measurements on one or more such cells, at least under certain circumstances when such autonomous cell measurements may have the potential to improve user experience. The wireless device may then autonomously perform such cell measurements.

The wireless device may make use of the cell measurements in any of various possible ways, possibly depending on the results of the cell measurements and/or the type of cell on which the measurements are performed. For example, in some instances, if the cell measurements for a cell of a more advanced cellular communication technology than its current cell (e.g., NR standalone, in comparison to LTE) are good, the wireless device may reselect from its current cell to that cell, e.g., to better support potential future high application data activity needs, and/or for any of various other possible purposes. As another possibility, if a cell on which such cell measurements are performed is a 5G NR cell that can be added to the wireless device's LTE serving cell as a non-standalone leg link, the cell measurements may be stored to potentially facilitate addition of the cell as a non-standalone cell in case the network triggers such a cell addition, e.g., to help handle high application data activity and/or for any of various other possible reasons. In some circumstances, such as if the cell measurements for a cell are good, that cell is a standalone cell, and the wireless device has high application data activity and a poor Wi-Fi link, the wireless device may initiate a radio resource control connection with its current cell, e.g., in anticipation of addition of the cell on which the autonomous measurements were performed as a non-standalone cell to handle the high application data activity. Another case where such autonomous measurements could help could include when the wireless device is running a heavy throughput application on a Wi-Fi link and the Wi-Fi link is becoming poor. In such a case, previously performed measurements may be used to help improve the user's perceived quality of service and to handle the higher application data activity, for example by facilitating switching the heavy throughput application data session to the cellular link if the cell on which the previously autonomously performed measurements are on a cell that operates according to a relatively advanced cellular communication technology (e.g., 5G NR, according to some embodiments).

Thus, the techniques described herein may enhance user experience by increasing the likelihood and/or reducing the setup time for sufficient data throughput to be available via wireless links of the wireless device to meet the application data needs of the wireless device, among various other possible benefits, at least according to some embodiments.

Note that the techniques described herein may be implemented in and/or used with a number of different types of devices, including but not limited to cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
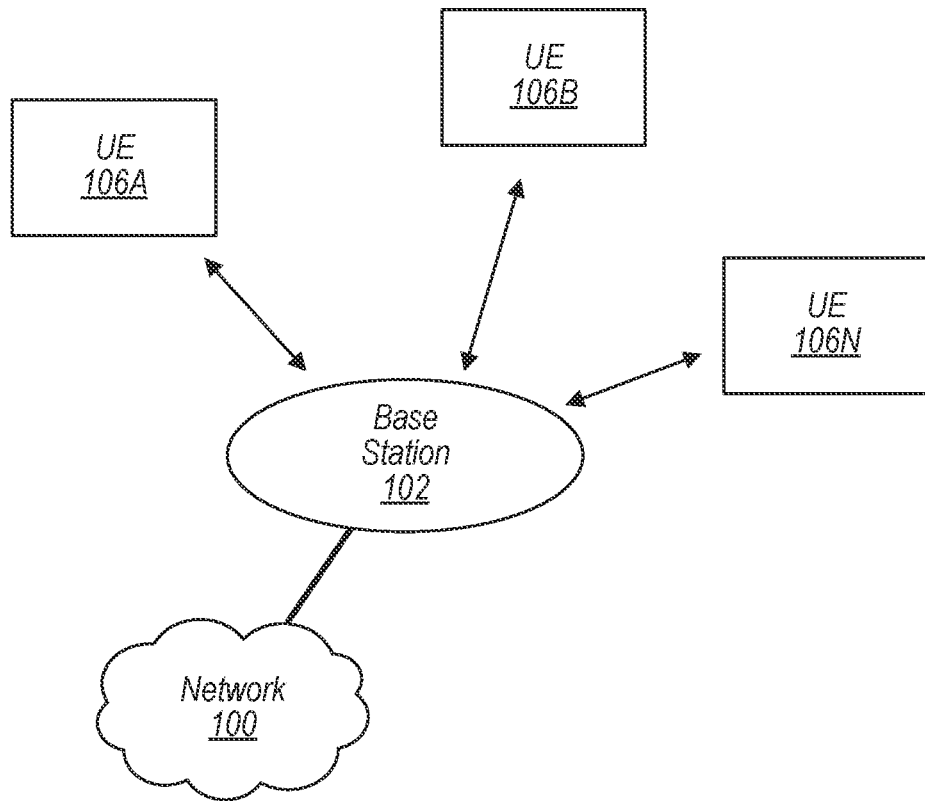
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DC: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State Information Interference Management
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
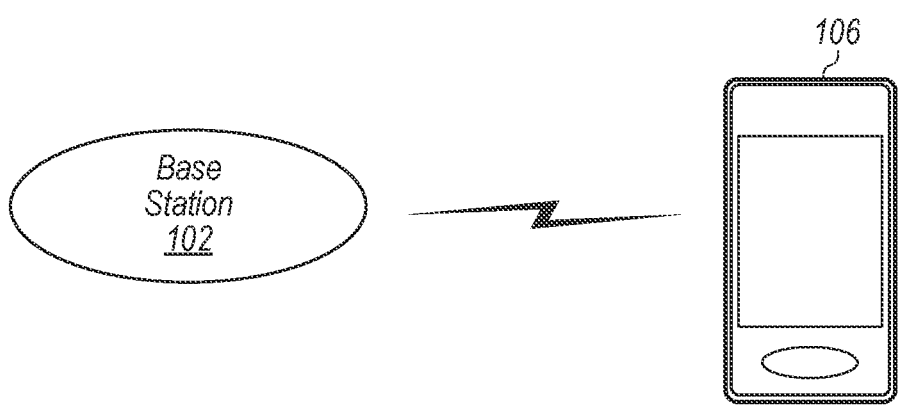
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for autonomously performing certain cell measurements in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
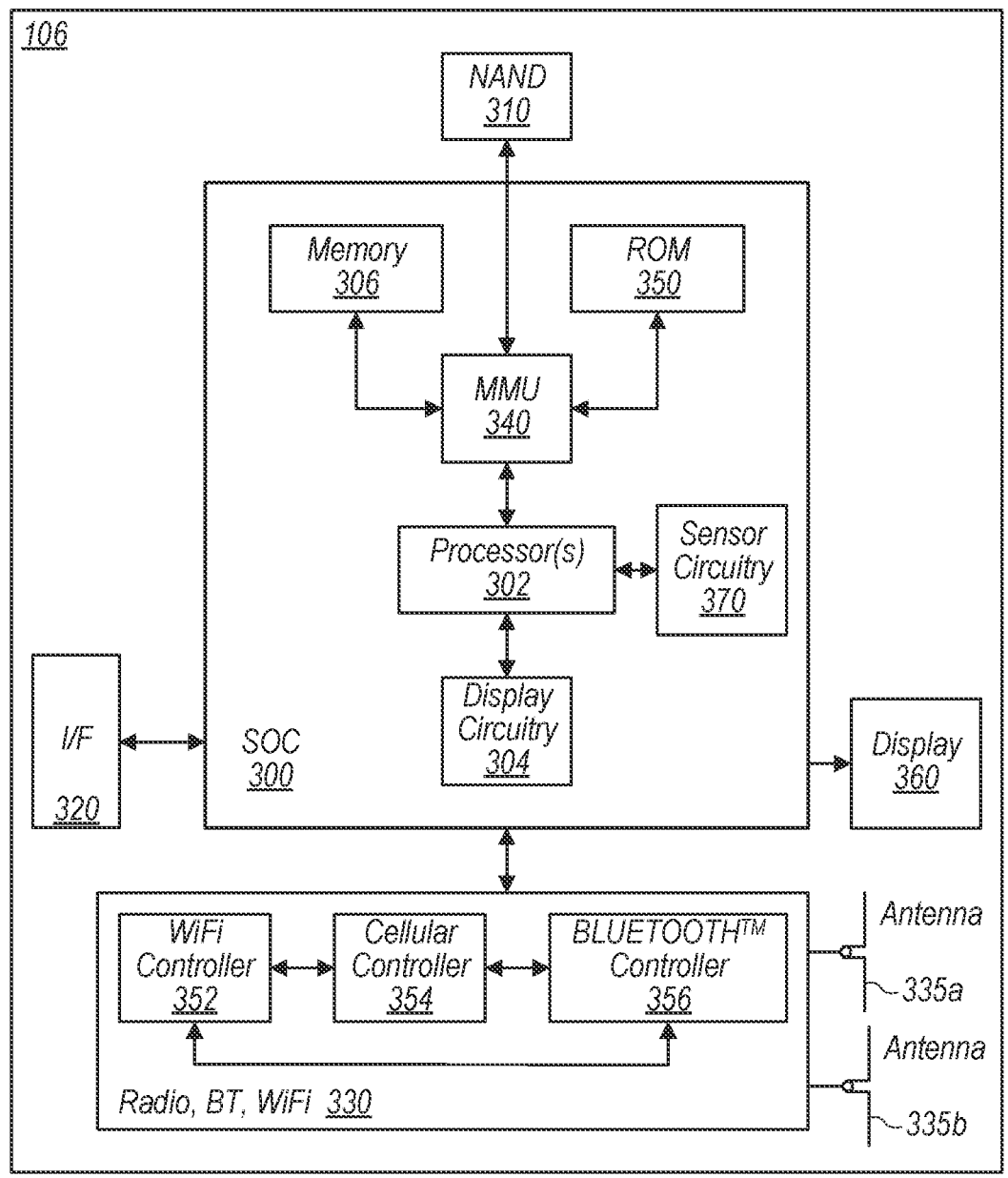
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to autonomously perform certain cell measurements in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to autonomously perform certain cell measurements in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
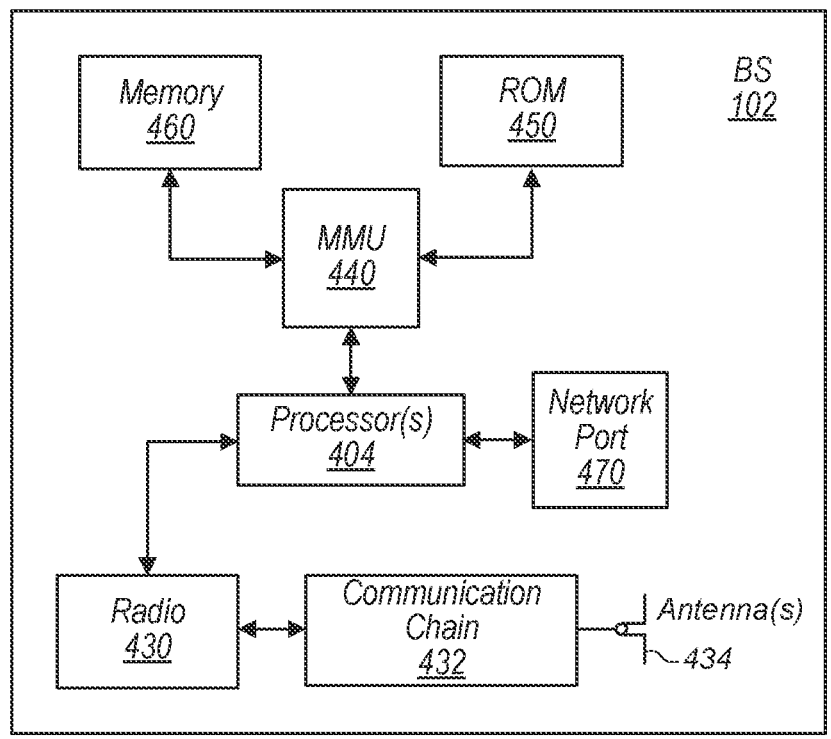
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A, WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Channel State Information

A wireless device, such as a user equipment, may be configured to measure the quality of the downlink channel and report information related to this quality measurement to the base station. For example, the UE may periodically send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality. Cell measurements may also be performed on neighbor cells at various times.

In most cellular systems, the base station transmits a pilot signal (or a reference signal), such as channel state information reference signals (CSI-RS), where this reference signal is used for estimating a channel (or a portion of a channel) between the base station and a UE. The UE receives this reference signal and based on this reference signal calculates channel state information (CSI). The UE then reports this channel state information back to the base station. The base station may then generate downlink data based on the received CSI and transmit this downlink data to the UE. Stated another way, the base station may adjust the manner in which downlink data is coded and generated based on the received channel state information from the UE.

As an example, in the 3GPP NR cellular communication standard, the channel state information fed back from the UE may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
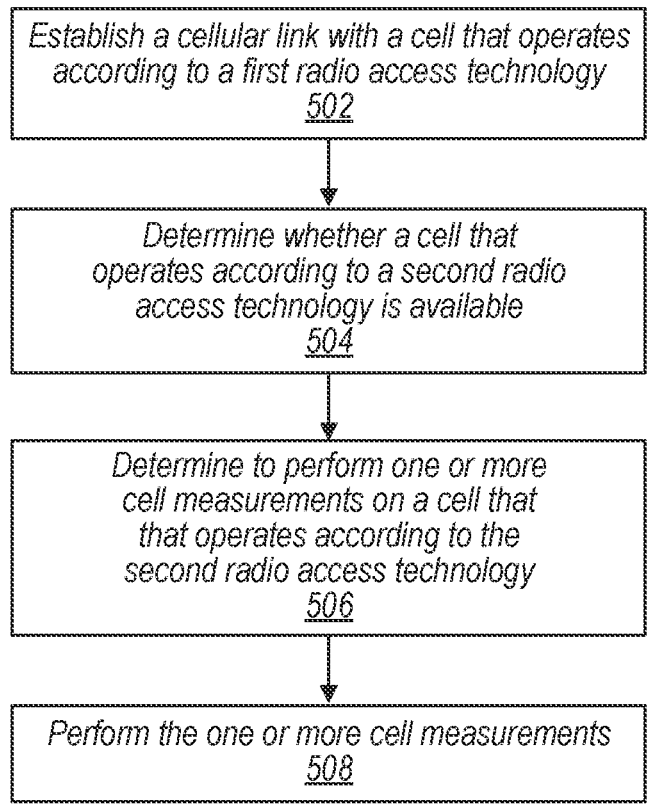
FIG. 5 is a flowchart diagram illustrating aspects of an exemplary possible method for a wireless device to autonomously perform certain cell measurements in a wireless communication system, according to some embodiments.

FIG. 5—Autonomous Cell Measurements

It is common in cellular communication for a cellular base station to facilitate cell measurements to be performed by a wireless enabled device that is attached to a cell provided by that cellular base station, at least at certain times. For example, the cellular base station may schedule a wireless enabled device to perform serving cell measurements for a serving cell provided by the cellular base station and neighbor cell measurements for certain neighbor cells at various times, which may operate according to the same radio access technology as the serving cell, or may operate according to a different radio access technology as the serving cell.

However, there may also be times when certain cell measurements that could be useful are not scheduled by a cellular network. For example, some scenarios may be possible in which 5G non-standalone (NSA) or standalone (SA) neighbor cells are available at the location of a wireless device while the wireless device is attached (e.g., in idle or connected mode) to an LTE serving cell, but cell measurements on the 5G neighbor cells are not scheduled by the LTE cell.

In such a scenario, there may be at least some circumstances where the wireless device could benefit from performing 5G cell measurements autonomously, for example to determine whether 5G service is available to the wireless device, and potentially to more quickly and/or more effectively be able to add the 5G service if such service may be expected to improve user experience.

Accordingly, it may be beneficial to provide techniques for a wireless device to autonomously determine when to perform neighbor cell measurements, and to autonomously perform such neighbor cell measurements, under at least some circumstances. To illustrate one such possible set of techniques, FIG. 5 is a flowchart diagram illustrating a method for a wireless device to autonomously perform certain cell measurements in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. The wireless link may be established according to a first radio access technology (RAT). According to some embodiments, the wireless link may include an LTE based cellular link, in which case the wireless enabled device will be connected to an eNB. As another possibility, the wireless link may include a 5G NR cellular link, in which case the wireless enabled device will be connected to a gNB. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell reselection (e.g., while in RRC idle or RRC inactive mode) to a new serving cell, e.g., due to wireless device mobility, changing wireless medium conditions, and/or for any of various other possible reasons.

At least in some instances, establishing the wireless link(s) may include the wireless device providing capability information for the wireless device. Such capability information may include information relating to any of a variety of types of wireless device capabilities.

In 504, the wireless device may determine whether at least one cell that operates according to a second RAT is available at the current location of the wireless device. The second RAT may be a different RAT than the first RAT. In some instances, the second RAT may be a RAT with higher capabilities than the first RAT, a newer RAT than the first RAT, and/or a RAT that can typically provide greater data throughput than the first RAT, among various possibilities. For example, in some embodiments, the first RAT may be LTE and the second RAT may be 5G NR. Other RAT combinations are also possible. The wireless device may determine whether any cells that operate according to the second RAT are available based at least in part on information stored by the wireless device.

The information stored by the wireless device may include information identifying cells that operate according to the second RAT. The cells identified in the information stored by the wireless device may include cells that operate according to the second RAT in the current location of the wireless device, and/or that operate in the vicinity of the cell to which the wireless device is attached, and/or may possibly include cells that operate according to the second RAT in one or more other locations and/or in the vicinity of one or more other cells. Thus, in some embodiments, if the information stored by the wireless device includes information identifying one or more cells that operate according to the second RAT in the current location of the wireless device, the wireless device may determine that at least one cell that operates according to the second RAT is available at the current location of the wireless device, while if the information stored by the wireless device includes does not include information identifying any cells that operate according to the second RAT in the current location of the wireless device, the wireless device may determine that no cells that operate according to the second RAT are available at the current location of the wireless device.

The information stored by the wireless device regarding availability of cells that operate according to the second RAT may be obtained in any of various possible ways. As one possibility, historical wireless device connection information may be used. For example, information identifying one or more cells that operate according to the second RAT may be stored by the wireless device based on previous wireless links between the wireless device and those one or more cells. As another possibility, the wireless device may receive and store information identifying one or more cells that operate according to the second RAT that is based on aggregated (e.g., crowdsourced) data from multiple wireless devices, such as data that is anonymously collected from certain wireless devices (e.g., those of a specific model or type, those sold by a specific vendor, etc.) with the consent of users of those wireless devices.

Note that the information identifying the cells may include any of various possible types of information. In some instances, such information could include cell frequency information, physical cell identifier information, and/or any of various other possible characteristics for some or all of the cells identified in the information stored by the wireless device. In some embodiments, if the second RAT is 5G NR, cells may be identified as being 5G SA cells or 5G NSA cells.

In 506, the wireless device may determine to perform one or more cell measurements on one or more cells that operate according to the second RAT. The wireless device may determine to perform the cell measurement(s) based on any of various possible considerations. In some embodiments, these considerations may at least include if it is determined that at least one cell that operates according to the second RAT is available at the current location of the wireless device.

Another possible (pre-)condition to autonomously determining to perform cell measurements on one or more cells that operate according to the second RAT may include one or more cellular subscription or service plan based conditions, which may for example be determined by the wireless device based on subscriber identity module (SIM) information for the wireless device. For example, the wireless device may determine whether the cellular subscription of the wireless device includes unlimited cellular data communication according to the second RAT; this may be beneficial in case the wireless device wants to switch a throughput-greedy data bearer to the second RAT. Thus, as one possibility, if the cellular subscription of the wireless device does not include unlimited cellular data communication according to the second RAT, the wireless device may determine to not autonomously perform cell measurements on cells that operate according to the second RAT. Other cellular subscription- or service plan-based conditions may also or alternatively be used when determining whether to autonomously perform cell measurements on cells that operate according to the second RAT, according to various embodiments.

Further possible considerations based on which the wireless device may determine whether to autonomously perform cell measurements on cells that operate according to the second RAT could relate to data communication activity levels at the wireless device. For example, in some instances, an application domain (e.g., an application processor and/or associated circuitry) of the wireless device could provide an indication of application data activity (e.g., a service request, an indication of an application data buffer level, an indication that one or more applications that are considered heavy data users are active, etc.) to a baseband domain (e.g., a baseband processor and/or associated circuitry) of the wireless device. As another example, the wireless device may (e.g., while in RRC connected mode) be able to estimate downlink buffer fullness for the wireless link. Thus, as one possibility, if one or more indicators of data communication activity are indicative of high data communication activity (e.g., a high data use application is active, the downlink buffer level for the wireless device is full or close to full, etc.), the wireless device may be more likely to determine to autonomously perform cell measurements on cells that operate according to the second RAT.

As another example, in some instances, certain Quality of Service related considerations may be used as conditions or triggers for autonomously performing cell measurements. For example, in some embodiments, a latency-based trigger (e.g., for an application with low latency requirements that may be better met by a link with a cell that operates according to the second RAT) may be implemented. Thus, as one possibility, if one or more indicators of low latency requirements and/or other Quality of Service based triggers are present, the wireless device may be more likely to determine to autonomously perform cell measurements on cells that operate according to the second RAT.

As yet another possible consideration, when the data bearer of the wireless device is established over Wi-Fi, the wireless device may assess the link quality of a Wi-Fi link of the wireless device and determine whether to perform cell measurements on cells that operate according to the second RAT based at least in part on the link quality of the Wi-Fi link. For example, in some instances, the wireless device may be more likely to determine to perform cell measurements on cells that operate according to the second RAT if the link quality of the Wi-Fi link of the wireless device is considered poor, such as if the Wi-Fi link currently has or recently has had signal strength and/or signal quality metrics below certain configured thresholds. In some instances, such a condition may be used in combination with a condition related to application data activity levels. For example, as one possibility, the wireless device may determine to perform cell measurements on cells that operate according to the second RAT based at least in part on data communication activity being high and the link quality of the Wi-Fi link of the wireless device being poor. Other conditions or techniques for making use of Wi-Fi link quality when determining whether to autonomously perform cell measurements on cells that operate according to the second RAT may also or alternatively be possible, according to various embodiments.

In some scenarios, wireless device motion, orientation, and/or mobility may be considered when determining whether to autonomously perform cell measurements on cells that operate according to the second RAT. For example, in some instances, the wireless device may determine a motion and/or orientation state of the wireless device, for example using motion/orientation sensing circuitry of the wireless device, and may determine whether to perform cell measurements on a cell that operates according to the second RAT based at least in part on the motion state of the wireless device. In some instances, such a condition may be used if previous such cell measurements have been performed, for example to avoid performing additional cell measurements on a cell when the results of those measurements may be unlikely to have changed significantly because the wireless device has remained stationary since those previous cell measurements, as one possibility. Orientation based considerations may be relevant for cells that operate in 3GPP Frequency Range (FR) 2 (e.g., "millimeter wave" or "mmWave" links), since in such scenarios it may be possible for cell measurements to change based on rotation and orientation changes (e.g., due to beamforming configuration differences) even when wireless device position is otherwise stationary. Other conditions or techniques for making use of such motion and/or mobility information when determining whether to autonomously perform cell measurements on cells that operate according to the second RAT may also or alternatively be possible, according to various embodiments.

In 508, the wireless device may perform the cell measurements on the determined cell(s). The cell measurements may include one or more signal strength (e.g., RSRP) and/or signal quality (e.g., RSRQ, SINR, etc.) measurements, according to some embodiments. In some instances, the wireless device may perform cell frequency and/or timing alignment for the determined cell(s). The wireless device may assess the cell, for example by determining whether cell signal strength meets one or more signal strength thresholds, and/or determining whether cell signal quality meets one or more signal quality thresholds, potentially for each cell on which the wireless device determines to perform autonomous cell measurements.

In some instances, the wireless device may determine whether the cell(s) on which measurements are autonomously performed are SA or NSA cells. As previously noted, at least in some instances, information stored by the wireless device identifying the cell(s) may also identify whether the cell(s) is (are) SA or NSA. Thus, at least as one possibility, the wireless device may determine whether a given cell is a SA cell or a NSA cell based on such information stored by the wireless device.

In some embodiments, the wireless device may determine to perform one or more further actions based on the results of the cell measurements and whether the cell or cells measured are SA cells and/or NSA cells. The action(s) selected and performed may further depend at least in part on whether the wireless link is in RRC idle mode or RRC connected mode, according to some embodiments. For example, as one possibility, if the wireless device is in RRC idle mode, the wireless device may determine whether to reselect to a cell that operates according to the second radio access technology, initiate a RRC connection using the existing wireless link, or store measurement results from the cell measurements based at least in part on whether the cell measurements meet the cell strength and/or quality thresholds and whether the cell that operates according to the second RAT is a SA cell or a NSA cell. In such a scenario, it may be the case that the wireless device reselects to the cell that operates according to the second RAT if that cell meets the cell strength and/or quality thresholds and if that cell is a SA cell, or initiates a RRC connection with its current cell if the cell that operates according to the second RAT meets the cell strength and/or quality thresholds and if that cell is a NSA cell, stores measurement results from the cell measurements (e.g., for possible future use), and waits until its serving cell adds the NSA cell to its wireless link, in which case, the wireless enabled device can use the stored measurements to expedite and ease the NSA cell link establishment.

In case the wireless device has autonomously performed cell measurements on a cell that operates according to the second RAT and that cell is a NSA cell, and the wireless device is in RRC connected mode (e.g., as a result of the wireless device initiating the RRC connection or receiving network paging indicating to establish the RRC connection), it may occur that the serving cell of the wireless device provides an indication to the wireless device to add a second wireless link with the cell that operates according to the second RAT, for example as a NSA leg. Such an addition may include configuration of cell measurements of the cell that operates according to the second RAT by the cellular base station, or the addition may be configured as a blind NSA cell addition (i.e., without configuration of cell measurements of the cell that operates according to the second RAT). In either or both such cases, the wireless device may make use of the autonomously performed cell measurements for the cell that operates according to the second RAT to assist with the NSA cell addition. For example, such measurement results may be used to facilitate cell acquisition for the added cell, which may allow the wireless device to more quickly (e.g., in the case of cell addition with cell measurements configured, since the configured measurements may have already been performed) and/or more reliably (e.g., in the case of blind cell addition) perform the cell addition.

Note that the wireless device may determine whether to autonomously perform cell measurements for one or more cells that operate according to the second RAT while attached to a serving cell that operates according to the first RAT, and may autonomously perform such measurements if it determines to do so, on multiple occasions. For example, in some instances, the wireless device may perform such measurements periodically (e.g., at every paging occasion or at a subset of paging occasions according to the first RAT while in idle mode according to the first RAT, or at some configured periodicity while in connected mode according to the first RAT, among various other possibilities) under certain conditions, and/or may determine to autonomously perform new cell measurements for one or more cells that operate according to the second RAT if certain conditions change and/or other triggers occur. Note, however, that the wireless device may also refrain from autonomously performing such cell measurements under some circumstances, for example to avoid unnecessary power consumption when the autonomous cell measurements would be unlikely to provide a corresponding benefit. For example, in some instances, if previous autonomous cell measurements have been performed in a location and the wireless device has remained stationary since those measurements, and/or does not have high application data activity, it may be the case that the wireless device refrains from performing additional autonomous cell measurements until the wireless device moves and/or a sufficiently high level of application data activity begins.

Thus, at least according to some embodiments, the method of FIG. 5 may be used by a wireless device to autonomously perform certain cell measurements in such a manner as to increase the likelihood of adding or reselecting to a cell that operates according to a different radio access technology when such an addition or reselection may improve data throughput and/or enhance user experience, at least in some instances.

FIGS. 6-9 and Additional Information

FIGS. 6-9 illustrate further aspects that might be used in conjunction with the method of FIG. 5 if desired. It should be noted, however, that the exemplary details illustrated in and described with respect to FIGS. 6-9 are not intended to be limiting to the disclosure as a whole: numerous variations and alternatives to the details provided herein below are possible and should be considered within the scope of the disclosure.

Figure 6:
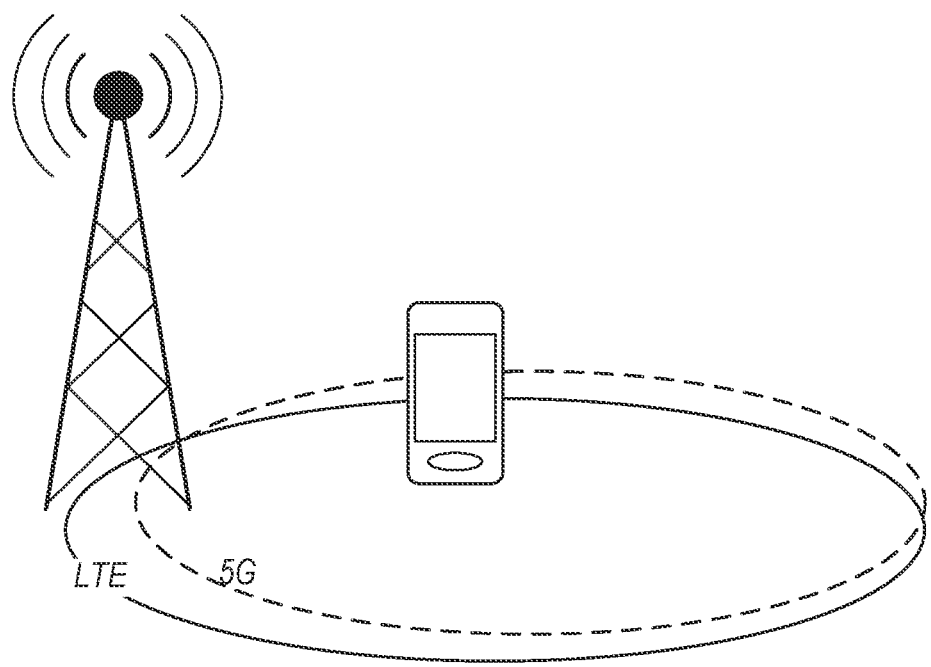
FIG. 6 illustrates aspects of an exemplary possible communication system in which both LTE and NR coverage are available in a location, according to some embodiments.

FIG. 6 illustrates aspects of an exemplary possible communication system in which both 4G LTE and 5G NR cellular coverage are available in a location, according to some embodiments. Thus, it may be possible that a UE in that location is connected to either an LTE cell, an NR cell, or both an LTE cell and an NR cell. For example, as one possibility, the UE may be connected to an LTE cell, where the LTE cell also supports 5G non-standalone (NSA) operation (e.g., such that it can add an NR cell for the UE if it determines to do so), and/or the LTE cell to which the UE is connected may have a 5G standalone (SA) neighbor cell.

In a scenario in which a UE is connected to a LTE cell with 5G NSA cell availability, it may be the case that the LTE cell attempts to add the 5G NSA cell for the UE. However, such a cell addition can fail in some circumstances, such as if the UE is unable to perform 5G cell acquisition sufficiently quickly, which may be caused at least in part by a lack of updated 5G cell measurements prior to the 5G NSA cell addition.

Accordingly, in such a scenario, as well as potentially in various other scenarios, it may be beneficial for a UE to schedule and perform 5G cell measurements autonomously, for example to facilitate adding or switching to a 5G cell in case such addition or switching is desired. Many UEs may include dual receive 5G-LTE capabilities such that the 5G physical layer and radio frequency (RF) subsystems can be used to perform 5G cell measurements without disrupting LTE connection activity. For example, a dual receive 5G-LTE capable device in LTE idle mode may be able to measure the 5G signal from a 5G cell during the LTE idle mode paging occasion without disrupting the LTE idle mode activities (e.g., decoding the paging, receiving LTE system information, etc.), and potentially without increasing the amount of time spent "awake" with baseband subsystems active. As another example, a dual receive 5G-LTE capable device in LTE connected mode may be able to measure the 5G signal from a 5G cell without disrupting the LTE connected mode transmission or reception activities.

A UE may be able to determine the 5G cell frequency information for the autonomous 5G cell measurements in any of various possible ways. As one possibility, a UE may use 5G cell frequency information from a previous connection with a (e.g., NSA or SA) 5G cell in the current location of the UE. As another possibility, a UE may be able to use 5G cell frequency information obtained from an aggregated crowdsourced location-based source of 5G cell frequency information. Other options are also possible.

In some embodiments, such measurements may be performed at selected times, for example based on certain conditions being met, such that the measurements may be performed or updated only as needed, e.g., to rationalize the usage of the measurement hardware and software resources and to avoid unnecessary or excessive power consumption. For example, conditions based on UE motion (e.g., as determined using UE motion estimation capabilities), gNB downlink buffer estimates (e.g., while in connected mode), and/or any of various other possible considerations may be used to determine when to autonomously perform 5G cell measurements when connected to an LTE cell.

The 5G cell measurements may be used by a UE for any of various purposes and/or in any of various ways. As one possibility, in LTE idle mode, if a data throughput heavy application is active on a Wi-Fi link of the UE and the Wi-Fi link quality deteriorates, and there is a NSA 5G cell in the location, the UE may use the stored 5G frequency information to start measurements and initiate a connection to the LTE network in case the 5G measurements are determined to be sufficient for a link with the 5G NSA cell to be established, as the UE may expect that the 5G NSA cell will be added based on the active application's high data throughput needs. Alternatively, if a SA 5G cell is supported where the UE is located, then the UE may reselect to the SA 5G cell if the autonomously performed 5G measurements are determined to be sufficient for a link with the 5G SA cell to be established, then the UE may initiate a connection request to connect to the SA 5G cell and start or handover (e.g., from the Wi-Fi link) the current data bearers to 5G, e.g., to potentially obtain better quality of service.

As another possibility, if the UE is already in LTE connected mode, the UE may autonomously perform 5G cell measurements to improve the likelihood of successful blind NSA 5G cell addition. Networks may generally add the 5G NSA cell leg when the downlink data buffer for the UE is nearly full and a 5G link may therefore be expected to clear out the downlink data buffer to improve user experience. In some instances, such 5G NSA cell additions may be configured blindly (i.e., when the network asks the UE to add a 5G NSA cell cellular link to its existing LTE cellular link without configuring the UE to measure the 5G NSA cell beforehand). This approach may be more likely to result in 5G cell addition failure, which can in turn potentially negatively impact user experience when adding the NSA 5G cell. The UE autonomously performing such measurements may increase the chances of the 5G NSA cell addition being successful in case the network adds the 5G NSA cell without enabling the UE to make measurements prior to the 5G NSA cell addition. Even if the 5G NSA cell addition is not configured blindly, the UE autonomously performing such measurements may allow the UE to report the configured measurement results back more quickly, which may result in the 5G NSA cell addition being completed more quickly, which may in turn also improve user experience, at least in some embodiments.

Figure 7:
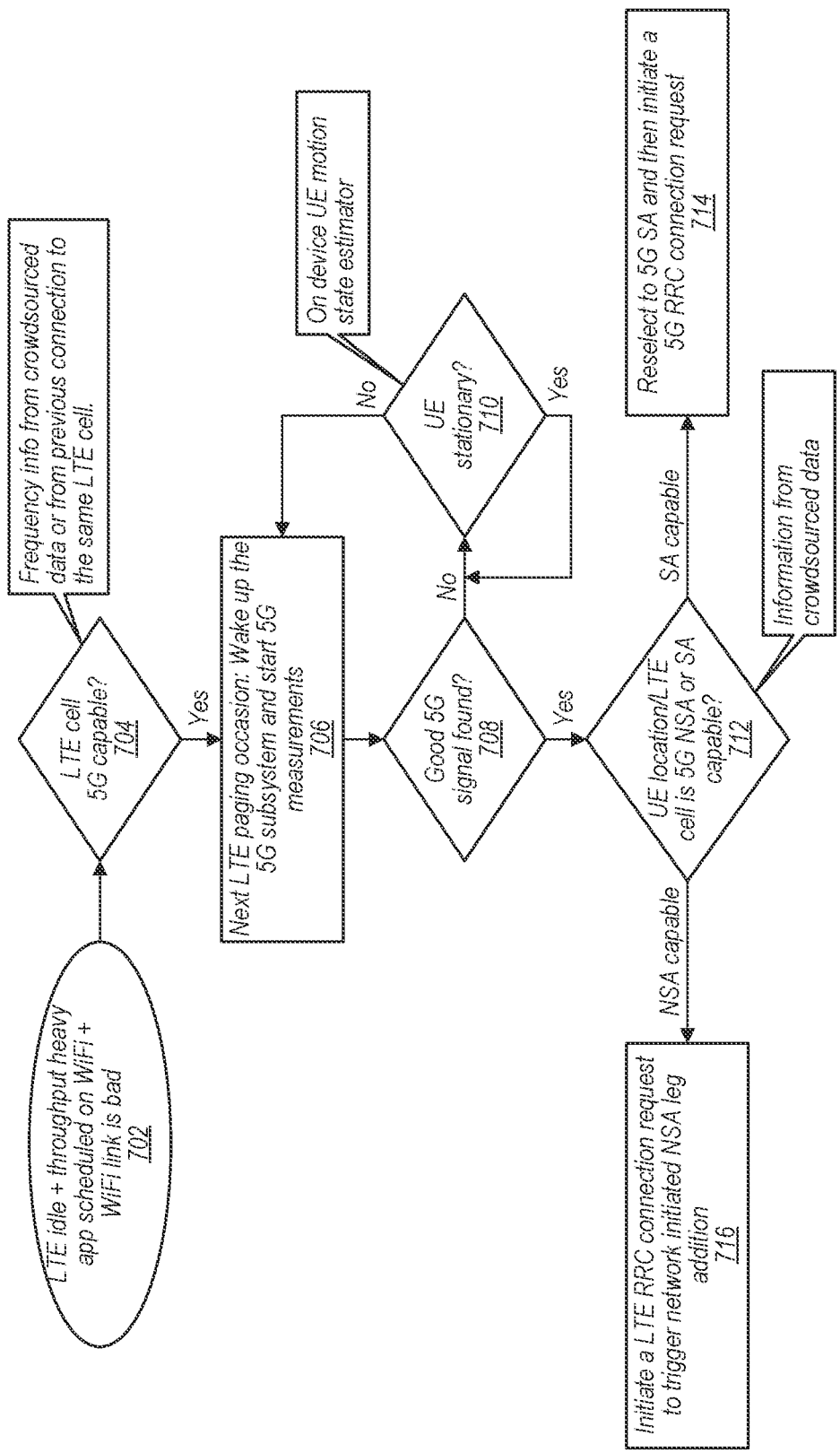
FIGS. 7-9 are flowchart diagrams illustrating aspects of exemplary possible methods for a wireless device to autonomously perform NR cell measurements when attached to an LTE cell in a wireless communication system, according to some embodiments.

FIG. 7 is a flowchart diagram illustrating aspects of one possible method for autonomously performing NR cell measurements when attached to an LTE cell in idle mode, according to some embodiments. Note that at least according to some embodiments, the UE implementing the illustrated method may perform the method based at least in part on cellular data plan characteristics for a cellular data plan of the UE. For example, as one possibility, the UE may implement the illustrated method if the UE has a cellular data plan that includes unlimited 5G cellular data communication.

In 702, the UE may initially be in LTE idle mode and a throughput heavy app may be scheduled on a Wi-Fi link of the UE. The Wi-Fi link may have poor link quality. Based on these conditions, the method of FIG. 7 may be initiated, and in 704, the UE may determine if the LTE cell to which it is attached is 5G capable. Whether the cell is 5G capable may be determined based on whether crowdsourced and/or UE historical data indicates that one or more 5G cells are available in the location of the UE and/or are associated with the LTE cell to which the UE is attached, at least as one possibility.

In 706, if the LTE cell is 5G capable, on the next LTE paging occasion, the 5G subsystem of the UE may be woken up and may start performing 5G measurements (e.g., on one or more 5G cell frequencies identified when determining if the LTE cell is 5G capable). In 708, the 5G measurements may be evaluated to determine if a good 5G signal (e.g., one that meets configured signal strength and/or quality thresholds or otherwise meets configured requirements to be considered a good 5G signal) is found. If a good signal is not found, in 710, the UE may evaluate (e.g., using an on-device motion state estimator) whether the UE is stationary (e.g., if the UE has detected an amount of motion below a configured threshold within a configured amount of time, or according to any of various other possible ways of determining whether the UE is stationary). If the UE is stationary, the method may wait and periodically re-evaluate whether the UE is stationary. If the UE is not stationary, the method may return to step 706 and the UE may wake up the 5G subsystem to perform 5G measurements again at the next LTE paging occasion.

If a good 5G signal is found, in 712, the UE may determine if the UE location and/or LTE cell is 5G NSA capable and/or 5G SA capable, e.g., based on crowdsourced and/or UE historical data regarding 5G cell availability in the location of the UE. If 5G SA capability is available, in 714, the UE may reselect to a 5G SA cell and may initiate a 5G RRC connection request. If 5G NSA capability is available, in 716, the UE may initiate a LTE RRC connection request to trigger a network initiated 5G NSA cell leg addition. Note that in case both 5G SA and 5G NSA cells are available, the UE may prioritize one over the other (e.g., 5G SA may be prioritized over 5G NSA, as one possibility), and/or one or more other criteria may be considered to determine whether to proceed from step 712 to step 714 or step 716, such as which of the available 5G cells has the better signal strength and/or signal quality.

Figure 8:
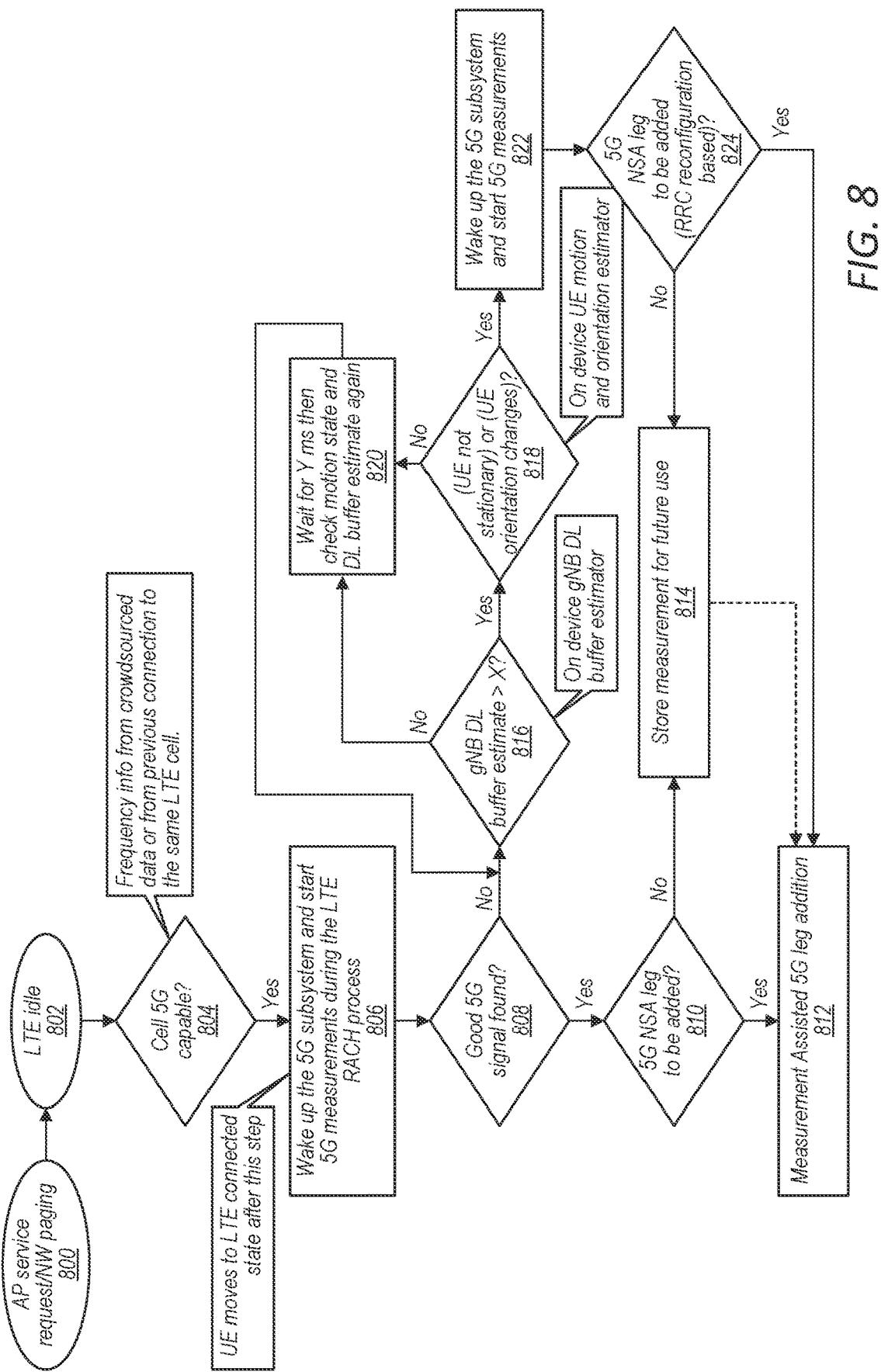

FIG. 8 is a flowchart diagram illustrating aspects of one possible method for autonomously performing NR cell measurements when attached to an LTE cell in connected mode or during the LTE connection establishment phase, according to some embodiments. Similar to FIG. 7, note that at least according to some embodiments, the UE implementing the illustrated method may perform the method based at least in part on cellular data plan characteristics for a cellular data plan of the UE. For example, as one possibility, the UE may implement the illustrated method if the UE has a cellular data plan that includes unlimited 5G cellular data communication.

As shown, the UE cellular baseband may receive an application processor (AP) service request or may receive network paging (800) while in LTE idle (802) and may determine to establish a RRC connection to the serving LTE cell. In 804, the UE may determine if the LTE cell to which it is attached is 5G capable. Whether the cell is 5G capable may be determined based on whether crowdsourced and/or UE historical data indicates that one or more 5G cells are available in the location of the UE and/or are associated with the LTE cell to which the UE is attached, at least as one possibility.

In 806, if the LTE cell is 5G capable, during the LTE random access channel (RACH) procedure, the 5G subsystem of the UE may be woken up and may start performing 5G measurements (e.g., on one or more 5G cell frequencies identified when determining if the LTE cell is 5G capable). In 808, the 5G measurements may be evaluated to determine if a good 5G signal (e.g., one that meets configured signal strength and/or quality thresholds or otherwise meets configured requirements to be considered a good 5G signal) is found.

If a good signal is found, in 810, it may be determined if a 5G NSA leg is to be added. If so, in 812, the UE may utilize the autonomously performed measurements to assist with the 5G leg addition. If not, in 814, the UE may store the measurement(s) for future use. If a 5G NSA leg is subsequently added while the measurement(s) remain valid, the stored measurements may be used to facilitate the subsequent 5G NSA leg addition.

If a good signal is not found, in 816, the UE may determine, using an on-device downlink buffer estimator, if the gNB downlink buffer size is greater than a configured threshold ("X"). If the buffer estimate is below the configured threshold, the UE may stop the method, or possibly may wait and periodically re-evaluate whether the buffer estimate is above the configured threshold (820). If the gNB downlink buffer size is greater than the configured threshold, in 818, the UE may evaluate (e.g., using an on-device motion and/or orientation state estimator) whether the UE is stationary and/or the orientation of the UE has changed. If the UE is stationary and the orientation has not changed, the UE may stop the method, or possibly may wait and periodically re-evaluate whether the UE is stationary and/or has changed orientation (820). Note that in the illustrated scenario, in 820, if the wireless device is stationary or downlink buffer estimate is below the configured threshold, the UE may wait a configured amount of time (e.g., "Y" ms), then check the motion/orientation state and/or DL buffer estimate again (e.g., returning to step 816). If the gNB downlink buffer estimate is above the configured threshold and the UE is not stationary or has changed orientation, in 822, the UE may wake up the 5G subsystem to perform 5G measurements again.

Note that link status, Quality of Service requirements, or any of various other possible considerations may also or alternatively be used as part of such a method, if desired. For example, while gNB DL buffer estimate is illustrated as one possible example trigger for determining when to autonomously perform cell measurements, a latency-based trigger (e.g., a trigger that is based on wireless device application data communication requirements for low latency communication and/or a trigger that is based on an estimation of network communication latency) and/or any of various other possible triggers or conditions for such determination are also possible.

In 824, the UE may determine if a 5G NSA leg is to be added (e.g., via RRC reconfiguration). If so, the method may also proceed to step 812, and the UE may utilize the autonomously performed measurements to assist with the 5G leg addition. If not, the method may also proceed to step 814, and the UE may store the measurement(s) for future use. If a 5G NSA leg is subsequently to be added while the measurement(s) remain valid, the stored measurements may be used to facilitate this the subsequent 5G NSA leg addition.

Figure 9:
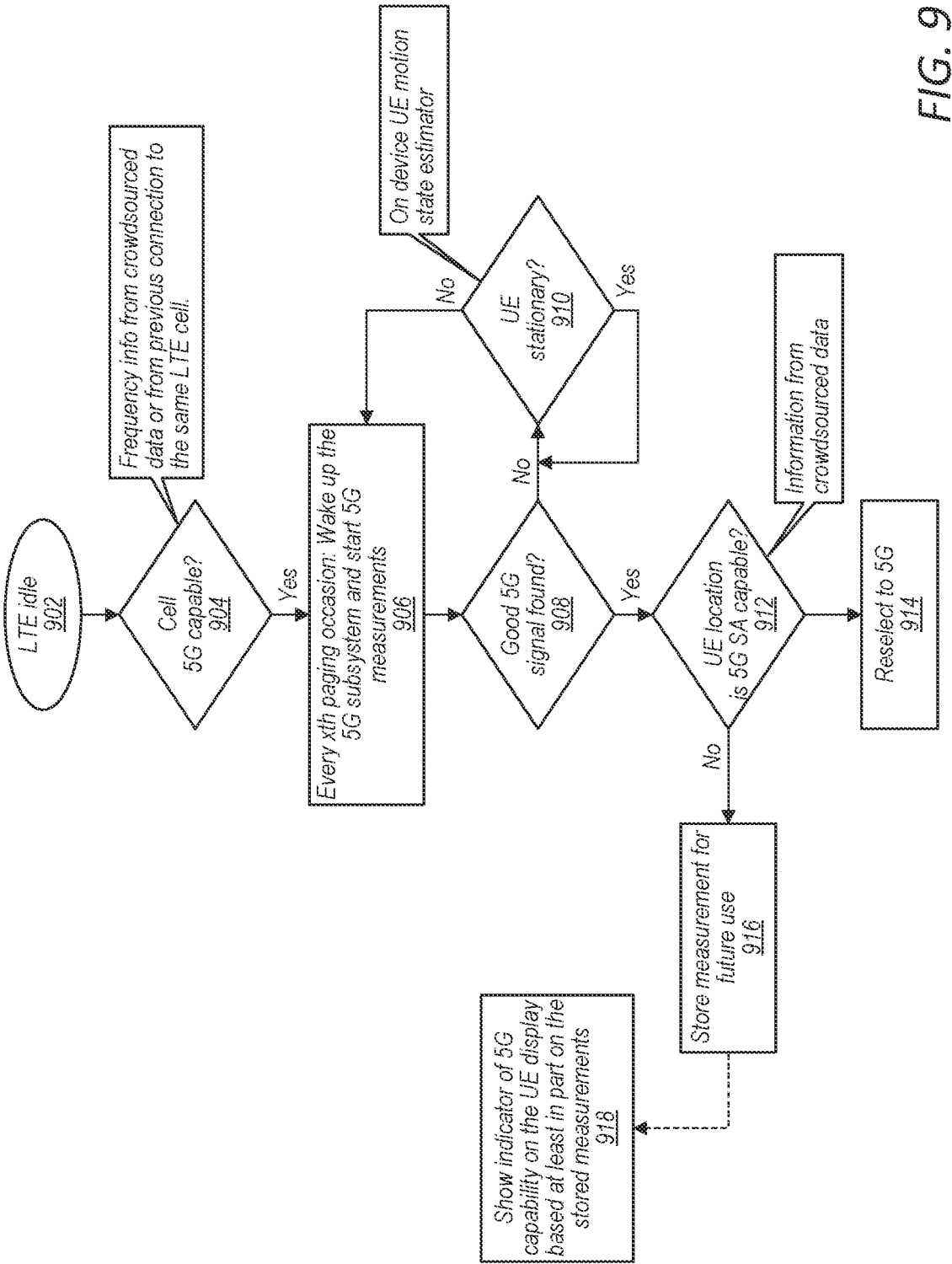

FIG. 9 is a flowchart diagram illustrating aspects of another possible method for autonomously performing NR cell measurements when attached to an LTE cell in idle mode, according to some embodiments. Note that at least according to some embodiments, the UE implementing the illustrated method may perform the method based at least in part on cellular data plan characteristics for a cellular data plan of the UE. For example, as one possibility, the UE may implement the illustrated method if the UE has a cellular data plan that includes unlimited 5G cellular data communication.

In 902, the UE may initially be in LTE idle mode. In 904, the UE may determine if the LTE cell to which it is attached is 5G capable. Whether the cell is 5G capable may be determined based on whether crowdsourced and/or UE historical data indicates that one or more 5G cells are available in the location of the UE and/or are associated with the LTE cell to which the UE is attached, at least as one possibility.

In 906, if the LTE cell is 5G capable, the UE may wake up the 5G subsystem of the UE and may start performing 5G measurements (e.g., on one or more 5G cell frequencies identified when determining if the LTE cell is 5G capable) periodically, such as every "x" LTE paging occasions, where x can be any of various possible integer numbers. In 908, the 5G measurements may be evaluated to determine if a good 5G signal (e.g., one that meets configured signal strength and/or quality thresholds or otherwise meets configured requirements to be considered a good 5G signal) is found. If a good signal is not found, in 910, the UE may evaluate (e.g., using an on-device motion state estimator) whether the UE is stationary. If the UE is stationary, the method may wait and periodically re-evaluate whether the UE is stationary. If the UE is not stationary, the method may return to step 906 and the UE may wake up the 5G subsystem to perform 5G measurements again at the next configured LTE paging occasion.

If a good 5G signal is found, in 912, the UE may determine if the UE location and/or LTE cell is 5G SA capable, e.g., based on crowdsourced and/or UE historical data regarding 5G cell availability in the location of the UE. If 5G SA capability is available, in 914, the UE may reselect to a 5G SA cell. If 5G SA capability is unavailable, in 916, the UE may store the measurement(s) for future use, e.g., to assist with a possible network initiated 5G NSA cell leg addition. In 918, the UE may determine whether to provide a user indication of 5G capability or availability based at least in part on the stored measurements. For example, if the stored measurements are sufficient that 5G cell addition is considered possible, the UE may determine to display an indication of 5G capability on a display of the UE.

The methods of FIGS. 7-9, and/or other such methods for autonomously performing 5G cell measurements when attached to a LTE cell, may make use of any of a variety of possible on-device and/or crowdsourced features, data, or functionality, according to various embodiments. For example, according to some embodiments, determination of whether the UE is stationary or not may be available from a UE motion state feature available on the UE, which may be enabled by any of various motion and/or rotation sensing components and associated processing circuitry. As another example, a cell level database storing some or all 5G frequencies detected and/or made use of by certain UEs that consensually provide crowdsourced data to the database may be used to determine whether a location or a LTE cell has 5G cell availability. Other features or aspects of UE operation that may be used by the techniques described herein may include the LTE idle mode paging cycle, the on-device gNB downlink buffer estimator, and/or any of various other possible features.

As another set of examples, according to some embodiments, a UE in LTE idle mode with an active application with heavy data use running on bad Wi-Fi may perform the following actions under various sets of conditions. As a first example, if the LTE cell has 5G cell neighbors, and the UE location is 5G SA capable, the UE may schedule autonomous 5G measurements, then reselect to the 5G SA cell and connect to the 5G SA cell if the 5G signal measured is deemed sufficiently good. As a second example, if the LTE cell is 5G capable, and the UE location is not 5G SA capable, the UE may schedule autonomous 5G measurements, then connect to LTE if the 5G signal measured is deemed sufficiently good, which may in turn result in 5G NSA leg addition because of the active application with heavy data use. As a third example, if the LTE cell is not 5G capable, and the UE location is not 5G SA capable, the UE may take no action with respect to performing autonomous 5G measurements, e.g., to conserve power, since such measurements may not be expected to find a good 5G cell.

As further set of examples, according to some embodiments, a UE in connected mode may perform the following actions under various sets of conditions. As a first example, if the LTE cell is 5G capable, and the UE gNB downlink buffer is estimated to be full (e.g., exceeds a certain threshold), the UE may schedule autonomous 5G measurements, e.g., in anticipation of a 5G NSA leg potentially being added. As a second example, if the LTE cell is 5G capable (i.e., has 5G NSA capability), and the UE gNB downlink buffer estimate is considered not full (e.g., does not exceed a certain threshold), the UE may store information regarding the LTE cell 5G capability and/or any previously performed 5G measurements for future use. As a third example, if the LTE cell is not 5G capable, and the UE location is not 5G SA capable, even if the UE gNB downlink buffer estimate is considered full, the UE may take no action with respect to performing autonomous 5G measurements, e.g., to conserve power, since such measurements may not be expected to find a good 5G cell.

In the following further exemplary embodiments are provided.

One set of embodiments may include an apparatus, comprising: a processor configured to cause a wireless device to: establish a wireless link with a cellular base station, wherein the wireless link is established according to a first radio access technology; determine whether at least one cell that operates according to a second radio access technology is available at a current location of the wireless device based at least in part on information stored by the wireless device; determine, if at least one cell that operates according to the second radio access technology is available at the current location of the wireless device, to perform one or more cell measurements on a cell that operates according to the second radio access technology; and perform the one or more cell measurements on the cell that operates according to the second radio access technology.

According to some embodiments, the information stored by the wireless device identifies one or more cells that operate according to the second radio access technology based at least in part on one or more previous wireless links between the wireless device and the one or more cells that operate according to the second radio access technology.

According to some embodiments, the information stored by the wireless device identifies one or more cells that operate according to the second radio access technology based at least in part on aggregated crowdsourced data from multiple wireless devices.

According to some embodiments, the processor is further configured to: estimate downlink buffer fullness for the wireless link, wherein determining to perform the one or more cell measurements on the cell that operates according to the second radio access technology is further based at least in part on the estimated downlink buffer fullness for the wireless link.

According to some embodiments, the processor is further configured to: determine one or more cellular subscription characteristics of a cellular subscription of the wireless device, wherein determining to perform the one or more cell measurements on the cell that operates according to the second radio access technology is based at least in part on the one or more cellular subscription characteristics.

According to some embodiments, the one or more cellular subscription characteristics include whether the cellular subscription of the wireless device includes unlimited cellular data communication according to the second radio access technology.

According to some embodiments, the processor is further configured to: determine a link quality of a Wi-Fi link of the wireless device, wherein determining to perform the one or more cell measurements on the cell that operates according to the second radio access technology is further based at least in part on the link quality of the Wi-Fi link of the wireless device.

Another set of embodiments may include a wireless device, comprising: an antenna; a radio operably coupled to the antenna; and a processor operably coupled to the radio; wherein the wireless device is configured to: establish a wireless link with a cellular base station, wherein the wireless link is established according to a first radio access technology; determine whether at least one cell that operates according to a second radio access technology is available at a current location of the wireless device based at least in part on information stored by the wireless device; determine, if at least one cell that operates according to the second radio access technology is available at the current location of the wireless device, to perform one or more cell measurements on a cell that operates according to the second radio access technology; and perform the one or more cell measurements on the cell that operates according to the second radio access technology.

According to some embodiments, when the wireless link with the cellular base station is in a radio resource control (RRC) idle mode, the wireless device is further configured to: determine whether one or more cell measurements on the cell that operates according to the second radio access technology meet one or more cell strength or quality thresholds; determine whether the cell that operates according to the second radio access technology is a standalone cell (e.g., 5G SA in case of 5G) or a non-standalone cell (e.g., 5G NSA in case of 5G); and determine whether to reselect to the cell that operates according to the second radio access technology, initiate a RRC connection with the cellular base station, or store measurement results from the one or more cell measurements based at least in part on whether the one or more cell measurements on the cell that operates according to the second radio access technology meet the one or more cell strength or quality thresholds and whether the cell that operates according to the second radio access technology is a standalone cell or a non-standalone cell.

According to some embodiments, when the wireless link with a cellular base station is in the RRC idle mode, the wireless device is further configured to: reselect to the cell that operates according to the second radio access technology if the cell that operates according to the second radio access technology meets the one or more cell strength or quality thresholds and if the cell that operates according to the second radio access technology is a standalone cell (e.g., 5G SA in case of 5G).

According to some embodiments, when the wireless link with a cellular base station is in the RRC idle mode, the wireless device is further configured to: initiate a RRC connection with the cellular base station if the cell that operates according to the second radio access technology meets the one or more cell strength or quality thresholds and if the cell that operates according to the second radio access technology is a non-standalone cell (e.g., 5G NSA in case of 5G).

According to some embodiments, when the wireless link with a cellular base station is in the RRC idle mode, the wireless device is further configured to: store measurement results from the one or more cell measurements.

According to some embodiments, when the wireless link with a cellular base station is in a radio resource control (RRC) connected mode, the wireless device is further configured to; estimate downlink buffer fullness for the wireless link, wherein determining to perform the one or more cell measurements on the cell that operates according to the second radio access technology is further based at least in part on the estimated downlink buffer fullness for the wireless link.

According to some embodiments, the wireless device is further configured to: determine a motion state of the wireless device, wherein determining to perform the one or more cell measurements on the cell that operates according to the second radio access technology is further based at least in part on the motion state of the wireless device.

Yet another set of embodiments may include a method, comprising: by a wireless device: establishing a first wireless link with a first cell provided by a cellular base station, wherein the first wireless link is established according to a first radio access technology; determining whether at least one cell that operates according to a second radio access technology is available at a current location of the wireless device based at least in part on information stored by the wireless device; determining, if at least one cell that operates according to the second radio access technology is available at the current location of the wireless device, to perform one or more cell measurements on a second cell that operates according to the second radio access technology; and performing the one or more cell measurements on the second cell.

According to some embodiments, the second cell is a non-standalone cell (e.g., 5G NSA in case of 5G) associated with the first cell, wherein the method further comprises: receiving an indication to add a second wireless link with the second cell, and adding the second wireless link with the second cell, wherein measurement results from the one or more cell measurements on the second cell are used to facilitate addition of the second wireless link with the second cell.

According to some embodiments, the second cell is a standalone cell (e.g., 5G SA cell in case of 5G), wherein the method further comprises: determining whether the one or more cell measurements on the second cell meet one or more cell strength or quality thresholds; and reselecting to the second cell based at least in part on the one or more cell measurements on the second cell meeting the one or more cell strength or quality thresholds.

According to some embodiments, the method further comprises: receiving, at a baseband processor of the wireless device, an indication of application data activity from an application processor of the wireless device, wherein determining to perform one or more cell measurements on the second cell is based at least in part on the indication of application data activity from the application processor of the wireless device.

According to some embodiments, the method further comprises: determining that link quality of a Wi-Fi link of the wireless device is below a threshold, wherein determining to perform one or more cell measurements on the second cell is further based at least in part on the link quality of the Wi-Fi link of the wireless device being below the threshold.

According to some embodiments, the first radio access technology includes LTE, wherein the second radio access technology includes 5G NR (NSA or SA).

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to, when executing instructions stored in a memory, perform operations comprising:
establishing a wireless link with a cellular base station, wherein the wireless link is established according to a first radio access technology;
determining whether at least one cell that operates according to a second radio access technology is available at a current location of the wireless device based at least in part on information stored by the wireless device;
determining, if at least one cell that operates according to the second radio access technology is available at the current location of the wireless device, to perform one or more cell measurements on a cell that operates according to the second radio access technology; and
performing the one or more cell measurements on the cell that operates according to the second radio access technology, wherein when the wireless link with the cellular base station is in a radio resource control (RRC) idle mode, the operations further comprise:
determining whether the one or more cell measurements meet one or more cell strength or quality thresholds;
determining whether the cell that operates according to the second radio access technology is a standalone cell or a non standalone cell; and
determining whether to reselect to the cell that operates according to the second radio access technology, initiate a RRC connection with the cellular base station, or store measurement results from the one or more cell measurements based at least in part on whether the one or more cell measurements meet the one or more cell strength or quality thresholds and whether the cell that operates according to the second radio access technology is a standalone cell or a non standalone cell.

2. The apparatus of claim 1,
wherein the information stored by the wireless device identifies one or more cells that operate according to the second radio access technology based at least in part on one or more previous wireless links between the wireless device and the one or more cells that operate according to the second radio access technology.

3. The apparatus of claim 1,
wherein the information stored by the wireless device identifies one or more cells that operate according to the second radio access technology based at least in part on aggregated crowdsourced data from multiple wireless devices.

4. The apparatus of claim 1, wherein the processor is further configured to:
estimate downlink buffer fullness for the wireless link, wherein determining to perform the one or more cell measurements on the cell that operates according to the second radio access technology is further based at least in part on the estimated downlink buffer fullness for the wireless link.

5. The apparatus of claim 1, wherein the processor is further configured to:
determine one or more cellular subscription characteristics of a cellular subscription of the wireless device, wherein determining to perform the one or more cell measurements on the cell that operates according to the second radio access technology is based at least in part on the one or more cellular subscription characteristics.

6. The apparatus of claim 5,
wherein the one or more cellular subscription characteristics include whether the cellular subscription of the wireless device includes unlimited cellular data communication according to the second radio access technology.

7. The apparatus of claim 1, wherein the processor is further configured to:
determine a link quality of a Wi-Fi link of the wireless device,
wherein determining to perform the one or more cell measurements on the cell that operates according to the second radio access technology is further based at least in part on the link quality of the Wi-Fi link of the wireless device.

8. A wireless device, comprising:
an antenna;
a radio operably coupled to the antenna; and
a processor operably coupled to the radio;
wherein the wireless device is configured to:
establish a wireless link with a cellular base station, wherein the wireless link is established according to a first radio access technology;
determine whether at least one cell that operates according to a second radio access technology is available at a current location of the wireless device based at least in part on information stored by the wireless device;
determine, if at least one cell that operates according to the second radio access technology is available at the current location of the wireless device, to perform one or more cell measurements on a cell that operates according to the second radio access technology; and
perform the one or more cell measurements on the cell that operates according to the second radio access technology, wherein when the wireless link with the cellular base station is in a radio resource control (RRC) idle mode, the wireless device is further configured to:
determine whether the one or more cell measurements meet one or more cell strength or quality thresholds;
determine whether the cell that operates according to the second radio access technology is a standalone cell or a non standalone cell; and
determine whether to reselect to the cell that operates according to the second radio access technology, initiate a RRC connection with the cellular base station, or store measurement results from the one or more cell measurements based at least in part on whether the one or more cell measurements meet the one or more cell strength or quality thresholds and whether the cell that operates according to the second radio access technology is a standalone cell or a non standalone cell.

9. The wireless device of claim 8, wherein the wireless device is further configured to:
reselect to the cell that operates according to the second radio access technology if the cell that operates according to the second radio access technology meets the one or more cell strength or quality thresholds and if the cell that operates according to the second radio access technology is a standalone cell.

10. The wireless device of claim 8, wherein the wireless device is further configured to:
initiate the RRC connection with the cellular base station if the cell that operates according to the second radio access technology meets the one or more cell strength or quality thresholds and if the cell that operates according to the second radio access technology is a non-standalone cell.

11. The wireless device of claim 8, wherein the wireless device is further configured to:
store measurement results from the one or more cell measurements.

12. The wireless device of claim 8, the wireless device is further configured to:
estimate downlink buffer fullness for the wireless link,
wherein determining to perform the one or more cell measurements on the cell that operates according to the second radio access technology is further based at least in part on the estimated downlink buffer fullness for the wireless link.

13. The wireless device of claim 8, wherein the wireless device is further configured to:
determine a motion state of the wireless device,
wherein determining to perform the one or more cell measurements on the cell that operates according to the second radio access technology is further based at least in part on the motion state of the wireless device.

14. A method, comprising:
establishing a first wireless link with a first cell provided by a cellular base station, wherein the first wireless link is established according to a first radio access technology;
determining whether at least one cell that operates according to a second radio access technology is available at a current location of a wireless device based at least in part on information stored by the wireless device;
determining, if at least one cell that operates according to the second radio access technology is available at the current location of the wireless device, to perform one or more cell measurements on a second cell that operates according to the second radio access technology; and
performing the one or more cell measurements on the second cell, wherein when the wireless link with the cellular base station is in a radio resource control (RRC) idle mode, the operations further comprise:
determining whether the one or more cell measurements meet one or more cell strength or quality thresholds;
determining whether the cell that operates according to the second radio access technology is a standalone cell or a non standalone cell; and
determining whether to reselect to the cell that operates according to the second radio access technology, initiate a RRC connection with the cellular base station, or store measurement results from the one or more cell measurements based at least in part on whether the one or more cell measurements meet the one or more cell strength or quality thresholds and whether the cell that operates according to the second radio access technology is a standalone cell or a non standalone cell.

15. The method of claim 14, wherein the second cell is a non-standalone cell associated with the first cell, wherein the method further comprises:
receiving an indication to add a second wireless link with the second cell; and
adding the second wireless link with the second cell, wherein measurement results from the one or more cell measurements on the second cell are used to facilitate addition of the second wireless link with the second cell.

16. The method of claim 14, wherein the second cell is a standalone cell, wherein the method further comprises:
determining whether the one or more cell measurements on the second cell meet one or more cell strength or quality thresholds; and
reselecting to the second cell based at least in part on the one or more cell measurements on the second cell meeting the one or more cell strength or quality thresholds.

17. The method of claim 14, wherein the method further comprises:
receiving, at a baseband processor of the wireless device, an indication of application data activity from an application processor of the wireless device,
wherein determining to perform one or more cell measurements on the second cell is based at least in part on the indication of application data activity from the application processor of the wireless device.

18. The method of claim 17, wherein the method further comprises:
determining that link quality of a Wi-Fi link of the wireless device is below a threshold,
wherein determining to perform one or more cell measurements on the second cell is further based at least in part on the link quality of the Wi-Fi link of the wireless device being below the threshold.

19. The method of claim 14,
wherein the first radio access technology includes LTE,
wherein the second radio access technology includes 5G NR.

20. The method of claim 14, further comprising:
initiating the RRC connection with the cellular base station if the cell that operates according to the second radio access technology meets the one or more cell strength or quality thresholds and if the cell that operates according to the second radio access technology is a non-standalone cell.

* * * * *